Oct. 12, 1943.  C. J. HACKBARTH ET AL  2,331,468

ROTARY TOOL

Filed Aug. 29, 1940

INVENTORS
C. J. HACKBARTH
C. V. LUNDEEN

BY

ATTORNEY

Patented Oct. 12, 1943

2,331,468

UNITED STATES PATENT OFFICE 2,331,468

ROTARY TOOL

Carl J. Hackbarth, Baltimore, and Carl V. Lundeen, Towson, Md., assignors to Western Electric Company, Incorporated, New York, N. Y., a corporation of New York Application August 29, 1940, Serial No. 354,674

1 Claim. (Cl. 144—32)

This invention relates to a rotary tool. More particularly it relates to a combination manual and power driven screw driver.

In the past difficulty has been experienced in some cases when attempting to drive small screws in starting the same when the operator was wholly dependent upon a power driven tool. It is possible, of course, to start the small part by means of a hand tool and, once having thus started it, to use a power driven tool. This has proved unsatisfactory in that it necessarily entailed loss of time in removing the hand tool from the slot in the head of the screw and in inserting the tool-bit of the power driven tool therein.

An object of the invention is to provide an effective and efficient means for driving screws.

In accordance with one embodiment of the invention, a tool is provided which may be used primarily as a hand tool to start the screw or other driven part, and a power driven unit having a rotating spindle is provided to which the hand tool may be coupled to complete the driving operation. The unit also has a spindle rotating in an opposite direction for unscrewing or turning out a screw or similar small part.

Figure 1:
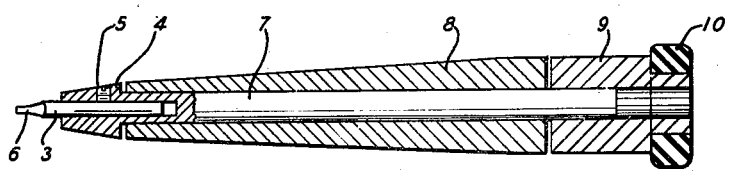
Figure 2:
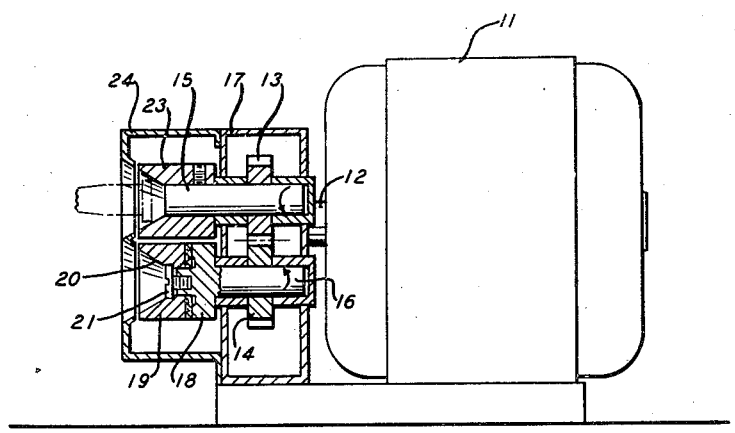

Other objects and advantages will more fully appear from the following detailed description taken in conjunction with the accompanying drawing, wherein Fig. 1 is a longitudinal sectional view of the driver portion of the tool, in this instance represented as a screw driver, and Fig. 2 is a side elevation partly in section of the motor drive unit.

Referring now to the drawing in detail, a removable shank 3 adapted to engage screws or fasteners may be clamped in a socket 4 by a set screw 5 or any other well-known means. One end of shank 3 is shaped to form a screw driver 6, which may cooperate with a depression in the head of a slotted screw. Integral with socket 4 is an elongated spindle 7 of reduced diameter which freely revolves within a sleeve or hand grip 8. One end of spindle 7 extends beyond sleeve 8 and attached thereto by a press fit is an enlarged collar 9 which serves to retain the sleeve 8 on spindle 7 and also constitutes a grip to permit manual rotation of the spindle. The outer extremity of collar 9 carries a rubber collar or other friction ring 10 which is secured to the collar 9.

A motor 11 for the drive unit has the usual drive shaft 12. Gears 13 and 14 on spindles 15 and 16 respectively are coupled to the drive shaft 12 through a conventional speed reducing gear system (not shown). Spindles 15 and 16, which rotate in opposite directions, are provided with suitable bearings and the gear train is enclosed in a housing 17.

The forward portion of spindle 16 extends beyond the gear box and has an enlarged portion 18, the front face of which constitutes a clutch face. A chuck member 19 is journaled on a projection 20 of the clutch face 18 and adjustably fastened thereto by a convenient means such as screw 21. The rear face of chuck 19 comprises the other portion of the slip clutch. A friction disk 22 may be employed between the clutch faces and is preferably attached to one of the faces. The forward part of chuck 19 is conically shaped to engage the friction collar 10 of the hand tool to rotate its spindle 7. Chuck 19 rotates in a clockwise direction to drive a screw in a forward direction. Chuck 23 is rigidly attached to spindle 15 and is geared to spindle 16 so that it rotates in a counterclockwise direction so as to drive the screw driver in a backward direction. Surrounding the chuck assembly is a guard 24 which protects the operator by preventing his hands from inadvertently coming in contact with the rapidly rotating parts.

In the operation of the device, the operator, using the manual part of the device as an ordinary screw driver, starts a small screw into the work until the threads engage. Having done this the operator, holding the work in one hand and the tool in the other, inserts the tool-bit into the slot of the screw head and holding it in this position he moves the work and tool toward the assembly shown in Fig. 2 until the collar 10 abuts and frictionally engages the rotating spindle chuck. The frictional engagement between collar 10 and the spindle chuck 19 serves to drive the screw driver until such time as the screw is fully secured in the work when the resistance to turning will overcome the clutch, at which time the operation is complete.

Should the operator desire to loosen a screw, he need only insert the collar 10 in the conical opening in spindle chuck 23, which is rotating in the opposite direction and will serve to unscrew the part, no clutch arrangement being necessary for when the operation is complete the screw or other part will drop out.

It is to be understood that the form of this invention, herewith shown and described, is merely a preferred example of the same and that various changes and modifications may be resorted to without departing from the spirit and scope of the invention.

What is claimed is:

In a power driven screwdriver, a pair of adjacent rotatable sockets, means for rotating the sockets in opposite directions, and a screwdriver designed to be freely manipulated by hand to turn a screw and having a resilient friction collar thereon that may be caused to frictionally engage one of the sockets to turn the screwdriver in one direction to advance a screw and to frictionally engage the other socket to turn the screwdriver in the opposite direction to withdraw a screw.

CARL J. HACKBARTH.
CARL V. LUNDEEN.